(12) United States Patent  (10) Patent No.: US 7,538,734 B2
Fujii et al.  (45) Date of Patent: May 26, 2009

(54) VEHICLE DECORATIVE COMPONENT

(75) Inventors: Tetsuya Fujii, Aichi-ken (JP); Chiharu Totani, Aichi-ken (JP); Tatsuya Oba, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 191 days.

(21) Appl. No.: 11/598,818

(22) Filed: Nov. 14, 2006

(65) Prior Publication Data
US 2007/0109206 A1  May 17, 2007

(30) Foreign Application Priority Data
Nov. 17, 2005  (JP) .............................. 2005-333381

(51) Int. Cl.
*H01Q 1/32* (2006.01)
*H01Q 1/42* (2006.01)
(52) U.S. Cl. ...................... 343/713; 343/872
(58) Field of Classification Search ................. 343/711, 343/713, 872
See application file for complete search history.

(56) References Cited
U.S. PATENT DOCUMENTS
4,358,772 A * 11/1982 Leggett ...................... 343/872
5,283,592 A * 2/1994 Bogorad et al. ............. 343/872
6,433,753 B1 * 8/2002 Zimmermann .............. 343/872

FOREIGN PATENT DOCUMENTS
JP  A-2002-135030  5/2002
JP  A-2004-309322  11/2004

* cited by examiner

*Primary Examiner*—Tan Ho
(74) *Attorney, Agent, or Firm*—Posz Law Group, PLC

(57) ABSTRACT

A radar device is placed rearward of a vehicle decorative component in a vehicle. The decorative component is located in the path of radar waves emitted from the radar device, and has a two-layer structure with a back layer and a protective layer. The protective layer is made of a transparent resin material, and the back surface of the protective layer contacts the front surface of the back layer. The back layer is made of a resin material. The front surface of the back layer includes a front contact surface on which ground pattern is formed. The protective layer and the back layer have the same refractive index. Thus, the decorative component has an improved transparency of radar waves.

11 Claims, 3 Drawing Sheets

VEHICLE DECORATIVE COMPONENT

BACKGROUND OF THE INVENTION

The present invention relates to a decorative component for a vehicle having a radar device.

Conventionally, some vehicles are equipped with a radar device located on the back of the front grille for measuring the distance with another vehicle or an obstacle by using radar waves. If a decorative component such as a metal emblem is located in the path of radar waves transmitted from the radar device, the radar waves are interfered by the component. This causes the radar device to function improperly.

Accordingly, for example, Japanese Laid-Open Patent Publication No. 2002-135030 discloses a vehicle decorative component that includes a back coating plate made of a material transparent to radar waves, an outer surface coating plate made of an optically transparent material that is also transparent to radar waves, and a metal film made of indium located between the back coating plate and the outer surface coating plate. The indium film is transparent to radar waves. Since the vehicle decorative component disclosed in Japanese Laid-Open Patent Publication No. 2002-135030 includes a metal film made of indium, the component has radar wave transparency as well as a metallic appearance.

Japanese Laid-Open Patent Publication No. 2004-309322 discloses a vehicle decorative component having a two-layer structure in which a substantially optically transparent protective layer and a back layer that are adhered to each other. In the vehicle decorative component of Japanese Laid-Open Patent Publication No. 2004-309322, the refractive index of the back layer is less than the refractive index of the protective layer, and protrusions and recesses are formed between the protective layer and the back layer. Although the decorative component of the publication No. 2004-309322 has no metal layer, light is reflected by the protrusions and recesses, which gives the component a metallic appearance.

Since the metal film of Japanese Laid-Open Patent Publication No. 2002-135030 is formed of a special metal, or indium, which has a high transparency to radar waves, the manufacturing costs are increased. In the vehicle decorative component of the publication No. 2004-309322, the refractive index of the back layer is less than that of the protective layer. Thus, the interface between the back layer and the protective layer is likely to refract and reflect radar waves. Such refractions and reflections of radar waves attenuate the intensity of the radar waves. As a result, the radar waves cannot readily pass through the decorative component of the publication No. 2004-309322.

SUMMARY OF THE INVENTION

Accordingly, it is an objective of the present invention to provide an inexpensive vehicle decorative component that has an improved transparency of radar waves.

In accordance with one aspect of the present invention, a vehicle decorative component located in a path of radar waves emitted from a radar device mounted in the vehicle is provided. The component includes a first layer and a second layer. The first layer is made of a transparent resin material, and has a back surface. The second layer is made of a resin material, and has a front surface that contacts the back surface of the first layer. A ground patter is formed on at least one of the back surface of the first layer and the front surface of the second layer. The refractive index of the first layer is the same as the refractive index of the second layer.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIGS. 1A to 2.

Figure 1A:
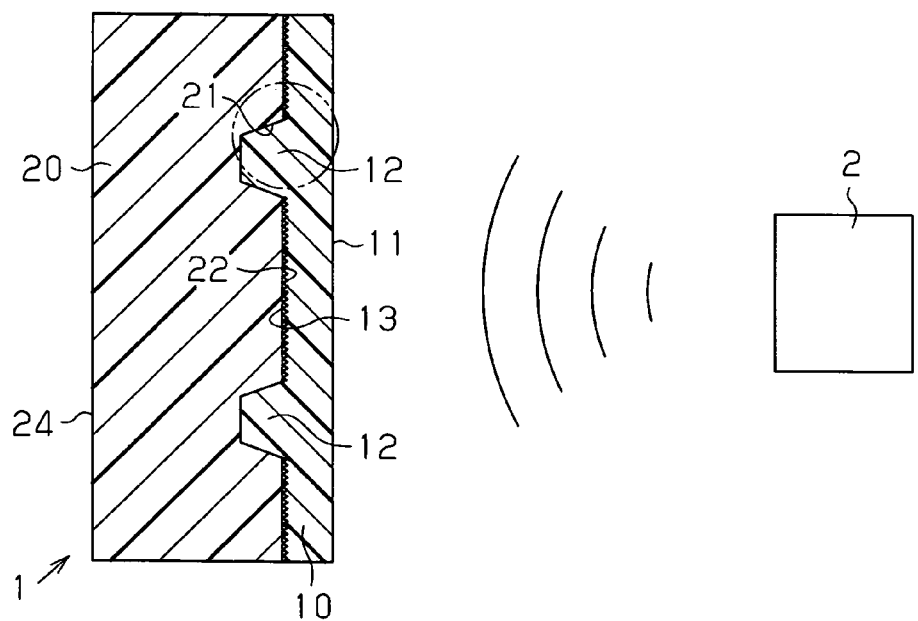
FIG. 1A is a schematic cross-sectional view showing a radar device and a vehicle decorative component according to one embodiment.
Figure 2:
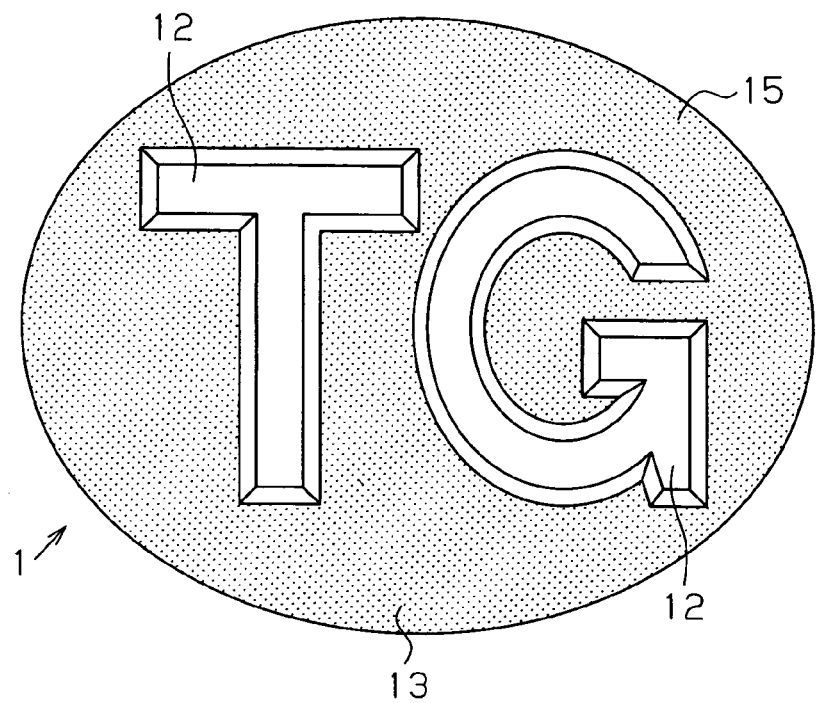
FIG. 2 is a schematic front view showing the vehicle decorative component show in FIGS. 1A and 1B.

In FIG. 1A, the left end is defined as a front side of a vehicle, and the right end is defined as a rear side of the vehicle.

As shown in FIG. 1A, a radar device 2 is located rearward of a vehicle decorative component 1 and in the engine compartment. Specifically, the radar device 2 is located in a portion that corresponds to the radiator grille. The radar device 2 is used for emitting high frequency electromagnetic waves such as millimeter waves forward of the vehicle, thereby measuring the distance with a preceding vehicle or an obstacle. The decorative component 1 is attached to the vehicle to be located in a path of radar waves emitted by the radar device 2. The decorative component 1 is provided, for example, at the radiator grille.

As shown in FIG. 1A, the decorative component 1 has a two-layer structure. Specifically, the decorative component 1 includes a first layer, which is a protective layer 20 in this embodiment, and a second layer, which is a back layer 10 in this embodiment. The protective layer 20 is located at the front side of the vehicle, and the back layer 10 is located closer to the radar device 2 when installed.

The back layer 10 is relatively thin and made of resin. The back layer 10 is colored to be translucent. When the wavelength of radar waves emitted by the radar device 2 is represented by a symbol $\lambda_e$, and the relative permittivity of the first layer is represented by a symbol $\epsilon_p$, the thickness of the back layer 10 is substantially equal to an integral multiplication of a value obtained by dividing half the wavelength by the square root of the relative permittivity. That is, the thickness of the back layer 10 is substantially equal to an integral multiplication of a value represented by the expression $(\lambda_e/2)/(\epsilon_p)^{1/2}$. In this embodiment, the thickness of the back layer 10 is, for example, set to 6 mm. In this specification, the expression "substantially equal thickness" refers to a thickness that is in a range of 1% of a reference thickness.

Figure 1B:
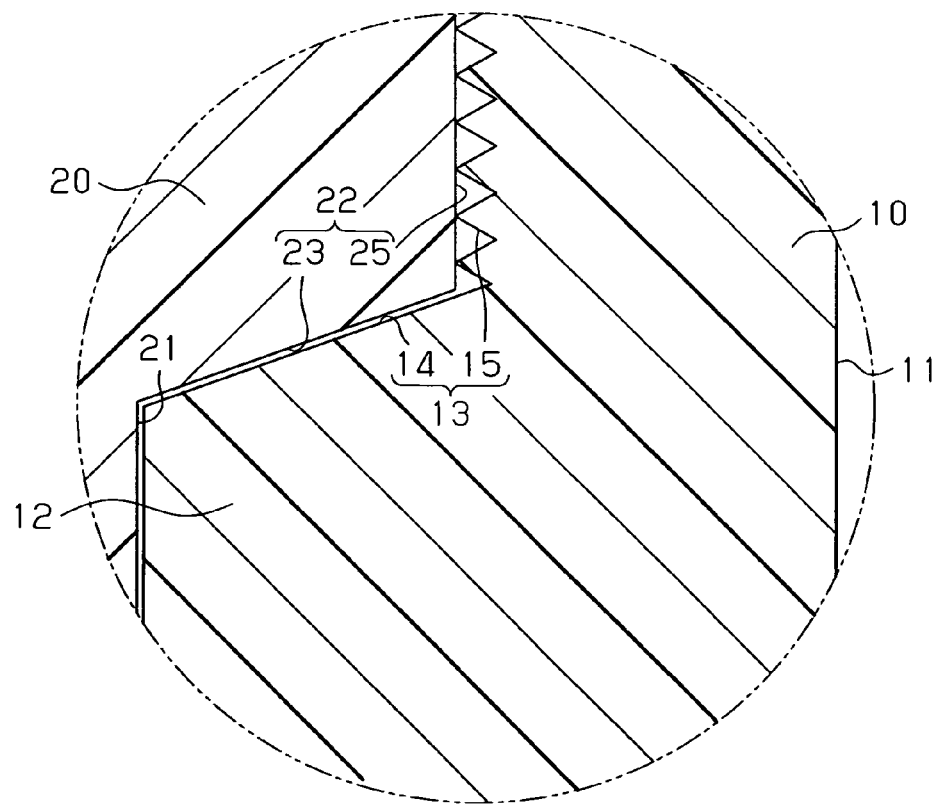
FIG. 1B is a partially enlarged cross-sectional view illustrating the vehicle decorative component.

A back 11 of the back layer 10 is a smooth surface that is designed to be directly attached, for example, to the vehicle radiator grille. As shown in FIG. 1A, projections 12 having a trapezoidal cross-section are formed on the front side of the back layer 10. As shown in FIGS. 1A and 1B, a front surface 13 of the back layer 10 includes projection surfaces 14 corresponding to the projections 12 and a front contact surface 15 on which a ground pattern is formed. In this specification, "ground pattern" refers to a visible pattern obtained by forming minute projections and recesses on a surface of an article. For the illustrative purposes, the minute projections and recesses that form ground pattern are shown in partially exaggerated sizes. The coarse surface refers to a surface having a surface roughness of 3.0 µm or more.

The protective layer 20, which contacts the back layer 10 as shown in FIG. 1A. is made of resin and optically transparent. The protective layer 20 is thicker than the back layer 10. In this embodiment, when, as shown above, the wavelength of radar waves emitted by the radar device 2 is represented by the symbol $\lambda_e$, and the relative permittivity of the first layer is represented by the symbol $\epsilon_p$, the thickness of the protective layer 20 is substantially equal to an integral multiplication of a value obtained by dividing half the wavelength by the square root of the relative permittivity. That is, the thickness of the protective layer 20 is substantially equal to an integral multiplication of a value represented by the expression $(\lambda_e/2)/(\epsilon_p)^{1/2}$. In this embodiment, the thickness of the protective layer 20 is, for example, set to 24 mm. As an optically transparent thick layer, the protective layer 20 is preferably thicker than 10 mm.

As shown in FIG. 1A, the protective layer 20 includes recesses 21. As shown in FIG. 1B, a back 22 of the protective layer 20 includes recess surfaces 23 corresponding to the recesses 21 and a back contact surface 25 parallel to a front surface 24 of the protective layer 20. The projections 12 of the back layer 10 are fitted in the recesses 21 of the protective layer 20, so that the back 22 of the protective layer 20 contacts the front surface 13 of the back layer 10. The protective layer 20 and the back layer 10 are made of the same material, which is polycarbonate. Also, the back layer 10 and the protective layer 20 have the same refractive index. To have "the same refractive index" refers to a case in which the refractive indexes are within a range of 0.1% difference.

An operation of the vehicle decorative component 1 will now be described.

The decorative component 1 is attached to the radiator grille of a vehicle. Since the front contact surface 15 has ground pattern as shown in FIG. 2, the contrast between the front contact surface 15 and the projections 12 is visible when viewed from front. Therefore, when the projections 12 form the shape of an emblem, a person recognizes the projections 12 as the emblem when viewing the decorative component 1. Since the protective layer 20 and the back layer 10, which form the decorative component 1, have the same refractive index, radar waves emitted by the radar device 2 are hardly refracted or reflected when passing through the decorative component 1. Thus, attenuation of the radar waves emitted by the radar device 2 is suppressed even if the radar waves pass through the decorative component 1, and the radar waves thus reach a target such as an obstacle or a preceding vehicle. After reaching an object or a preceding vehicle, the radar waves are reflected by the object or the preceding vehicle and return to the radar device 2 after passing through the decorative component 1. When passing though the decorative component 1, the radar waves, which have been reflected by an object or a preceding vehicle, are not significantly attenuated. Also, when passing through the front contact surface 15 on which the ground pattern is formed, the radar waves are hardly refracted or reflected and readily pass the front contact surface 15.

This embodiment provides the following advantages.

(1) In the decorative component 1, the back 22 of the protective layer 20 and the front surface 13 of the back layer 10 contact each other, and ground pattern is formed on the front contact surface 15. The protective layer 20 and the back layer 10 have the same refractive index. Therefore, when passing through the interface between the protective layer 20 and the back layer 10, the radar waves are hardly refracted or reflected. Also, since the ground pattern is formed on the front contact surface 15, the projections 12, in which no ground pattern is formed, is recognized as the shape of an emblem when the decorative component 1 is viewed from front.

(2) The back layer 10 is colored to be translucent. Also, the ground pattern is formed on the back layer 10 except for the projections 12. Therefore, the projections 12 are visually distinct.

(3) The protective layer 20 is optically transparent and thicker than the back layer 10. Therefore, although the back layer 10 is relatively thin, the protective layer 20 protects the back layer 10 from external impacts. The decorative component 1 thus has a sufficient durability.

It should be apparent to those skilled in the art that the present invention may be embodied in many other specific forms without departing from the spirit or scope of the invention. Particularly, it should be understood that the invention may be embodied in the following forms.

Figure 3:
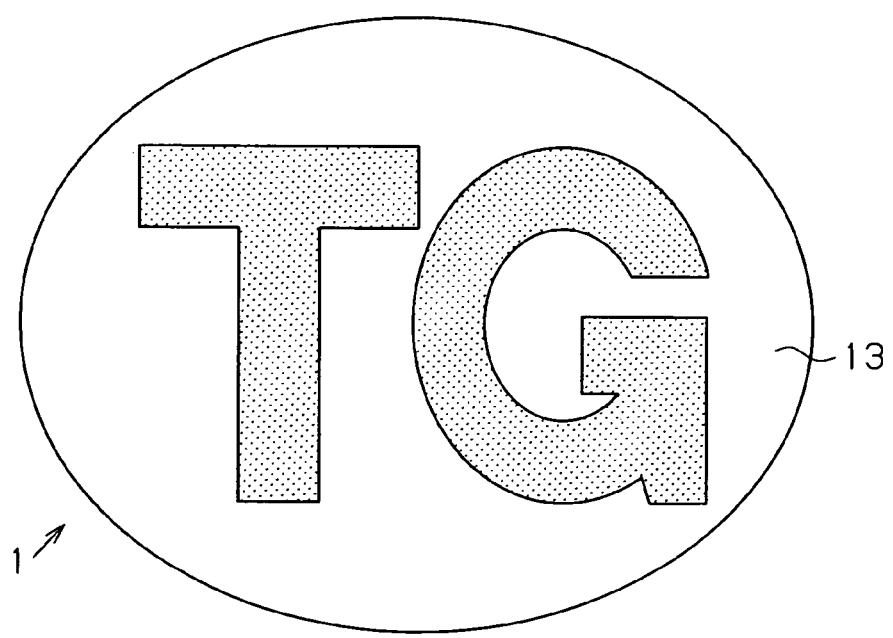
FIG. 3 is a schematic front view showing a vehicle decorative component according to a modified embodiment.
Figure 4:
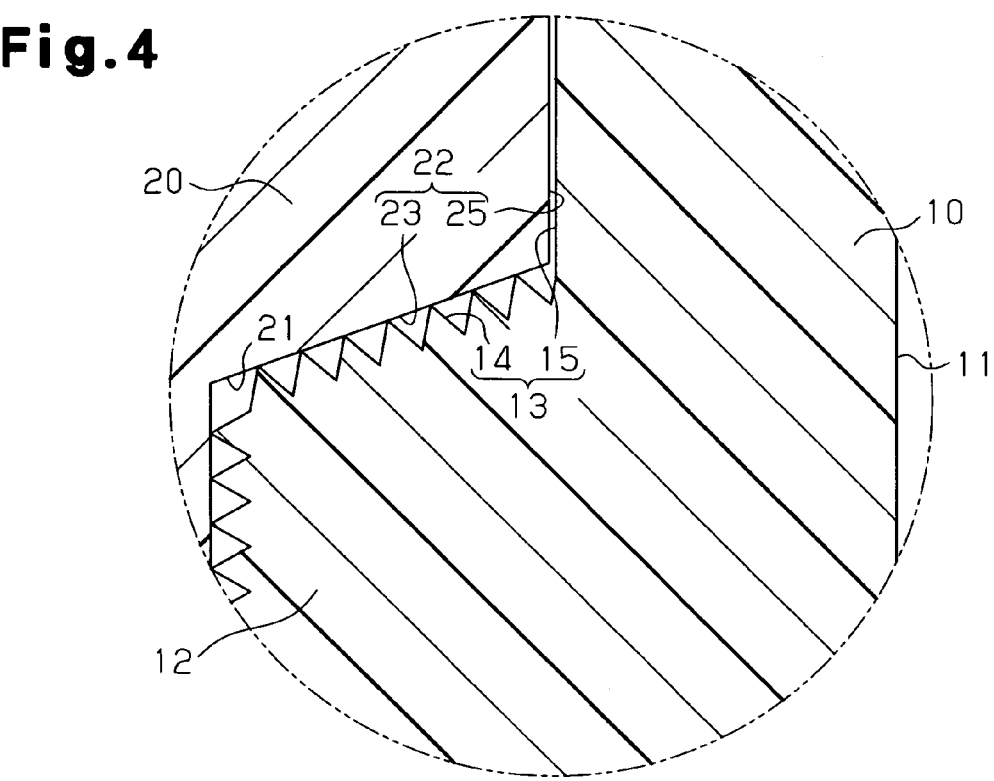
FIG. 4 is a cross-sectional side view showing a vehicle decorative component according to another modified embodiment.

The projections 12 formed on the back layer 10 and the recesses 21 formed on the protective layer 20 may be omitted. In this case, ground pattern is formed in predetermined sections of the front surface 13 of the back layer 10 as shown in FIG. 3, so that the ground pattern is recognized as an emblem when the decorative component 1 is viewed. Also, ground pattern may be formed on sections that do not correspond to the emblem so that sections without ground pattern are recognized as the emblem.

Instead of forming ground pattern on the front contact surface 15, ground pattern may be formed on the projection surfaces 14 and the front contact surface 15 may be formed as a smooth surface. In this case also, the contrast between the projections 12 and the other sections is distinct, so that the projections 12 are recognized as the emblem when the decorative component 1 is viewed.

Figure 5:
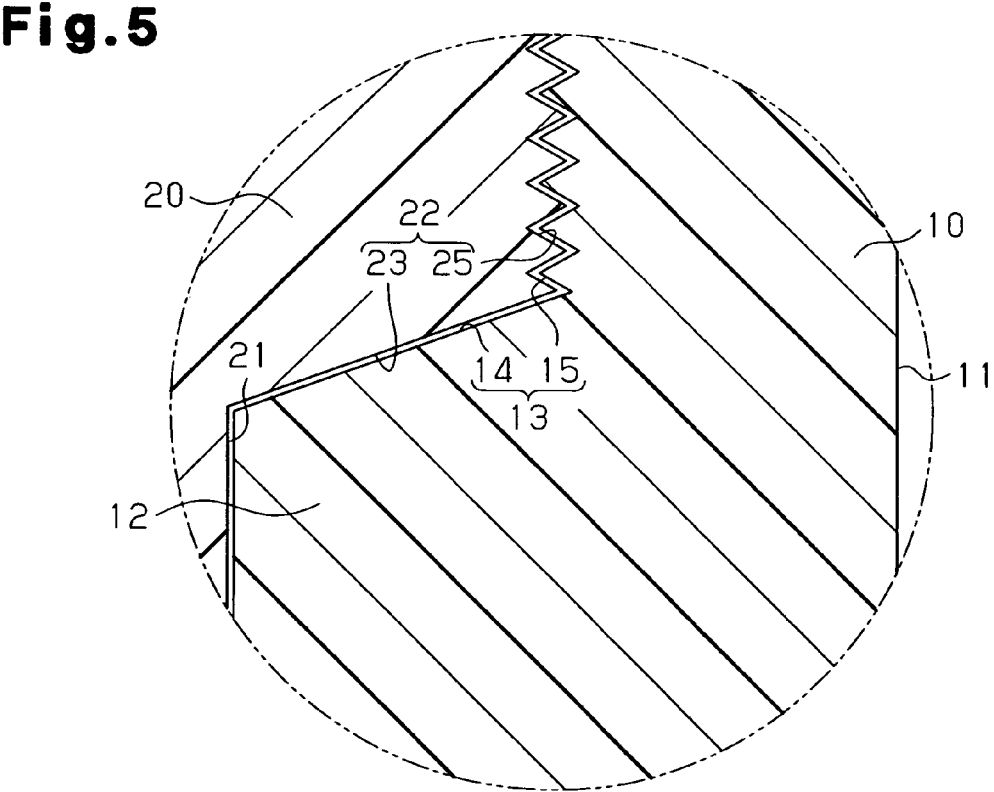
FIG. 5 is a cross-sectional side view showing a vehicle decorative component according to a further modified embodiment.

Ground pattern may be formed in other portions in addition to the front contact surface 15. For example, as shown in FIG. 5, in addition to the front contact surface 15, ground pattern may be formed on the back contact surface 25.

The decorative component 1 does not need to have a two-layer structure. For example, the decorative component 1 may have a three-layer structure with a second protective layer made of optically transparent resin, which second protective layer is provided on the front surface 13 of the protective layer 20. Further, the decorative component 1 may have a four-layer structure with another back layer provided on the back 22 of the back layer 10. In these cases, all the layers need to have the same refractive index.

The shapes of minute recesses and projections in the ground pattern on the front contact surface 15 are not limited to any specific shapes. For example, the minute recesses and projections may have rectangular or trapezoidal cross-sections.

The thicknesses of the back layer 10 and the protective layer 20 are not limited to any specific values. For example, the protective layer 20 may be thicker. Also, the thickness of the back layer 10 may be 24 mm, so that the back layer 10 has the same thickness as the protective layer 20. Alternatively, the back layer 10 may be thicker than the protective layer 20. However, the thicknesses of the protective layer 20 and the back layer 10 are substantially equal to an integral multiplication of a value obtained by dividing half the wavelength by the square root of the relative permittivity $((\lambda_e/2)/(\epsilon_p)^{1/2})$.

The back layer 10 does not need to be translucent. For example, the back layer 10 may be made of an optically transparent material or an opaque material. Also, the back layer 10 may be colored in any color.

The back layer 10 and the protective layer 20 may be formed of different materials. For example, the back layer 10 may be made of syndiotactic polystyrene, and the protective layer 20 may be made of polyvinyl chloride. Even if the back layer 10 and the protective layer 20 are made of different materials, the decorative component 1 has a favorable transparency to radar waves as long as the used materials have the same refractive index.

The shapes of the projections 12 formed on the back layer 10 and the recesses 21 formed on the protective layer 20 are not limited to any specific shapes. For example, the projections 12 may have rectangular cross-sections, and the recesses 21 may be shaped to correspond to the shapes of the projections 12.

Instead of forming the projections 12 on the front surface 13 of the back layer 10 and the recesses 21 on the back 22 of the protective layer 20, projections may be formed on the back 22 of the protective layer 20 and recesses may be formed on the front surface 13 of the back layer 10. Even in this case, the projections formed on the protective layer 20 and the recesses formed on the back layer 10 form the shape of an emblem.

Instead of forming ground pattern on the front contact surface 15 of the back layer 10, part of the back layer 10 may be colored. For example, sections corresponding to the projections 12 may be formed to be optically transparent, and sections corresponding to the front contact surface 15 may be colored, so that the projections 12 is visually distinct from the front contact surface 15. In this case also, the contrast between the projections 12 and the other sections is distinct, so that the projections 12 are recognized as the emblem.

The invention claimed is:

1. A vehicle decorative component located in a path of radar waves emitted from a radar device mounted in the vehicle, the component comprising:
   a first layer made of a transparent resin material, the first layer having a back surface; and
   a second layer made of a resin material, the second layer having a front surface that contacts the back surface of the first layer, wherein
   a relatively large recess is formed on the back surface of the first layer, and a relatively large projection is formed on the front surface of the second layer, and
   a ground pattern is formed on at least one of the back surface of the first layer and the front surface of the second layer, the ground pattern being a visible pattern obtained by forming minute projections and recesses on the surface, and wherein the refractive index of the first layer is the same as the refractive index of the second layer.

2. The vehicle decorative component according to claim 1, wherein the second layer is colored.

3. The vehicle decorative component according to claim 1, wherein the first layer is thicker than the second layer.

4. The vehicle decorative component according to claim 1, wherein the ground pattern has a surface roughness of 3.0 μm or greater.

5. The vehicle decorative component according to claim 1, wherein The first layer and the second layer are made of the same material.

6. The vehicle decorative component according to claim 5, wherein the first layer and The second layer are made of polycarbonate.

7. The vehicle decorative component according to claim 1, wherein, when the wavelength of radar waves emitted by the radar device is represented by a symbol $\lambda_e$, and the relative permittivity of the material is represented by a symbol $\epsilon_p$, the thicknesses of the first and second layers are each substantially equal to an integral multiplication of a value represented by the expression $(\lambda_e/2)/(\epsilon_p)^{1/2}$.

8. The vehicle decorative component according to claim 1, wherein a recess is formed in a back side of the first layer, a projection corresponding to the recess is formed in the second layer, and the recess and the projection each have a smooth surface.

9. The vehicle decorative component according to claim 8, wherein the thickness of the first layer is 10 mm or greater.

10. A vehicle decorative component located in a path of radar waves emitted from a radar device mounted in a vehicle, the component comprising:
    a first layer made of a transparent resin material, the first layer having a back surface and a first layer refractive index;
    a second layer made of a resin material, the second layer having a front surface configured to contact the back surface of the first layer and a second layer refractive index that is the same as the first layer refractive index; and
    a visible ground pattern configured as a pattern of minute projections and recesses on at least one of the back surface of the first layer and the front surface of the second layer.

11. The vehicle decorative component according to claim 10, wherein
    the back surface of the first layer includes a back surface recess, and the front surface of the second layer includes a front surface projection configured to fit within the back surface recess so that the back surface of the first layer contacts the front surface of the second layer, and
    the front surface projection and the back surface recess are large in size relative to a size of the pattern of minute projections and recesses that form the visible ground pattern.

* * * * *